Oct. 17, 1967    D. WEISBERGER    3,346,875
NOSE AND LIP PROTECTOR APPARATUS
Filed June 3, 1965

INVENTOR.
DAVID WEISBERGER
BY
ATTORNEY

United States Patent Office 3,346,875
Patented Oct. 17, 1967

3,346,875
NOSE AND LIP PROTECTOR APPARATUS
David Weisberger, 101 Ellwood Ave.,
Mount Vernon, N.Y. 10552
Filed June 3, 1965, Ser. No. 461,047
4 Claims. (Cl. 2—9)

More particularly, this invention relates to improvements in apparatus for protecting the nose and lip portions of the body from the elements substantially irrespective of the prevailing weather conditions, and particularly to preclude these portions from becoming sunburned, windburned, or otherwise abused by exposure thereto.

Accordingly, it is a primary object of the present invention to provide an improved nose and lip protector apparatus for protecting those portions of the body from the elements substantially irrespective of the prevailing weather conditions, and more particularly, to prevent those portions from becoming sunburned, windburned, or otherwise abused by exposure to the elements, and comprising nose and lip protecting portions that are particularly adapted to be detachably connected to and with a pair of eyeglasses.

Another primary object of this invention, in addition to the foregoing objects, is to provide improved nose and lip protecting apparatus to protect those portions of the body from the elements substantially irrespective of the prevailing weather conditions, and more particularly, from becoming sunburned, windburned, or otherwise abused by exposure thereto, and comprising nose and lip portions that are particularly adapted to be detachably connected to a pair of eyeglasses, said nose and lip portions being detachably connected to one another, enabling a user to utilize the nose and lip portions in combination or conjunction with one another, further enabling user to utilize either one of said nose and lip portions individually or independently of one another.

Yet another primary object of the present invention, in addition to each and every one of the foregoing objects, is to provide improved nose and lip protecting apparatus for protecting those portions of the body from the elements, substantially irrespective of the prevailing weather conditions, and more particularly, to protect the nose and lip portions from becoming sunburned, windburned, or otherwise abused by exposure thereto, and comprising nose and lip protecting portions that are particularly adapted to be detachably connected to a pair of eyeglasses, said nose and lip portions being detachably connected with respect to one another, and the lip portion being so constructed and arranged as to enable user to continue to perform certain normal functions notwithstanding the lip portion being disposed in protective relationship with the lips.

Furthermore, it is a primary object of this invention, in addition to each and every one of the foregong objects, to provide improved nose and lip protector apparatus for protecting those portions of the body from the elements, substantially irrespective of the prevailing weather conditions, and more particularly, to preclude the nose and lips from becoming sunburned, windburned or otherwise abused by exposure thereto, said nose and lip portions being comparatively simple of construction, durable, highly efficient and reliable in use, compact, light in weight, comfortable, and capable of ready fabrication with a minimal capital expenditure.

Other objects and important features of the present invention will be apparent from a study of the specification following taken with the drawing, which together show, illustrate, describe and disclose a preferred embodiment or modification of the invention, and what is now considered to be the best mode of practicing the principles thereof. Other embodiments or modifications may be suggested to those having the benefit of the teachings herein, and such other embodiments or modifications are intended to be reserved especially as they fall within the scope and spirit of the sub-joined claims.

Figure 1:
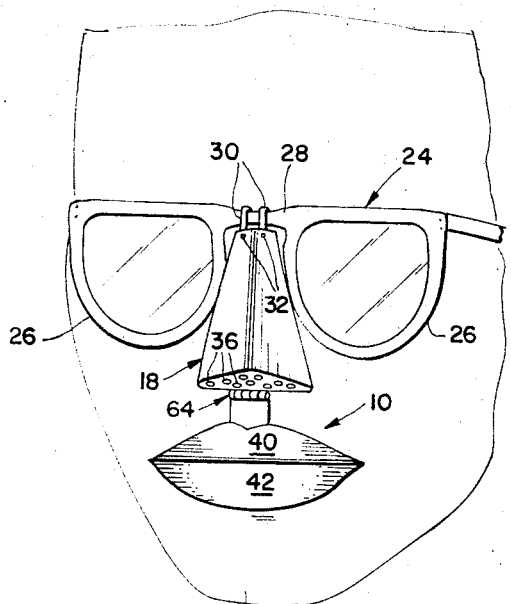
FIG. 1 is an illustration of an improved nose and lip protector apparatus constructed in accordance with the principles of the present invention as it will appear in use.
Figure 2:
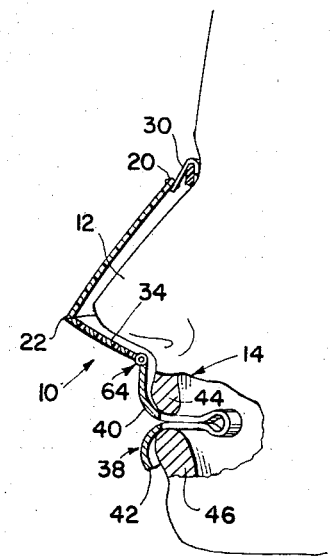
FIG. 2 is a side elevational view, partially in section, illustrating the improved nose and lip protector apparatus shown in FIG. 1.

With reference now to the drawing, there is illustrated therein a nose and lip protecting apparatus constructed in accordance with the principles of the present invention, and generally designated by the reference character 10. As particularly illustrated in FIGS. 1 and 2, the apparatus 10 is particularly adapted to be disposed in a protecting relationship with respect to the nose 12 and the lips 14 of the head 16 of a body.

The nose and lip protecting appartus 10 comprises a nose protecting portion or nose shield 18 which is of generally V-shaped tapering configuration from a narrow cross-section at an upper end 20 thereof to a cross-section of substantially increased width at a lower end 22 thereof. The nose shield 18, as is considered readily apparent, preferably is arranged to fit neatly the shape, contour and configuration of the nose 12, and preferably is of natural skin color so as to be as inconspicuous as possible. The shield may be fabricated of any suitable material, such as celluloid, or other synthetic material, though it may be constructed of a translucent material which will reduce the intensity of the rays that impinge upon the nose to thus preclude severe sunburn, while yet enabling normal tanning of the epidermal tissue at the nose 12 to take place without causing discomfort.

As will be described in greater detail hereinafter, the nose shield 18 is particularly adapted to be utilized individually, and, to that end, is particularly adapted to be detachably connected with a pair of eyeglasses 24. The eyeglasses 24 comprise a plurality of lense frames 26, which are connected to one another by a bridge 28. While of course, the nose shield 18 may be utilized with eyeglasses 24 having lense frames 26 that can be fabricated of any suitable material, preferably the shield is utilized with eyeglasses having lense frames and a bridge, such as the bridge 28, fabricated of a suitable resilient plastic material, enabling the space between the lense frames to be increased or decreased by bending or turning them about a vertical axis extending centrally through the bridge. In this manner, an adjustment for nose shields of different sizes can be effected, thus reducing the amount or degree of annoying play between the shield and the eyeglasses when they are detachably disposed in operative relationship with respect to one another. This is particularly true since, as will be realized, the lense frames 26 are particularly adapted to abut against the sides of the nose shield 18 when the latter is being utilized.

In order to detachably connect the nose protecting portion or shield 18 to the eyeglasses 24, it comprises a plurality of fastening elements 30 which are preferably of hook-shaped configuration, enabling them to be disposed about the bridge 28. The fastening elements 30 may be fabricated of any suitable material, such as a springy or resilient metal, in which case they may be connected to the nose shield 18 in any suitable manner, as through the medium of rivets 32. The fastening elements 30 may equally as well be fabricated of a suitable resilient plastic material, and may even be fabricated of the same material as the shield 18. In this instance, the fastening elements 30 may be integrally fabricated with the shield. In either case, the fastening elements 30 are fabricated or so constructed and arranged as to snugly and firmly engage the bridge 28 to preclude inadvertent and frequent dislodgment therefrom, and any annoying play therebetween. This relationship between the fastening elements 30 and the bridge 28, and the abutting relationship between the lense frames 26 and the nose shield 18 along the sides thereof, as hereinbefore described, will render the shield comfortable to wear during extended periods of usage.

The nose shield 18 further comprises an integral perforated bottom portion 34 having a substantial plurality of apertures 36 extending therethrough. As is considered readily apparent, this construction insures the user that he will be able to continue to perform normal bodily functions without any interference therewith.

The improved protector apparatus 10 comprises, further, a lip protecting portion or lip shield, generally designated by the reference character 38. The lip shield 38 in a similar manner to the nose shield 18, is particularly adapted to shield, guard, or protect the lips or lip portion 14 against the elements, substantially irrespective of the prevailing weather conditions, and particularly to preclude the same from becoming sunburned, windburned, or otherwise abused by exposure thereto.

The lip shield 38 comprises an upper lip shield or guard portion or member 40, and a lower lip shield, or guard portion or member 42. Each of these portions, as is considered readily apparent, are fabricated of a contour or configuration that substantially conforms with the upper and lower lips 44 and 46, respectively, of the lip portion or mouth 14. Each of the members 40 and 42 comprise adjacent edge portions 48 and 50, respectively, of curvilinear configuration, enabling a major portion of the surfaces of the lips 44 and 46 to be exposed, further enabling the continued performance of certain normal functions, such as the placing of an article therebetween.

Each of the members 40 and 42 further comprise walls 52 and 54, respectively, that extend inwardly of the mouth 14 at the corners 56 and 58 thereof. These walls 52 and 54 are particularly adapted to be joined or connected with one another in any suitable manner, as for example, by integrally fabricating the shield 38. More particularly, the walls are particularly adapted to be joined in such a manner as to form a loop 60 at each end of the shield. The loops themselves are contoured to define grooves or notches 62 for co-operation with the corners 56 and 58 of the mouth, so that the shield will fit snugly with respect thereto, enabling the shield to be retained from accidental displacement or dislodgement therefrom.

Figure 3:
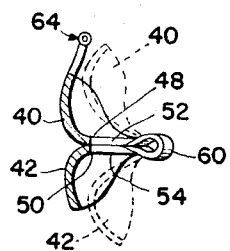
FIG. 3 is a side view, in section, of the lip protecting portion of the apparatus illustrating in FIGS. 1 and 2.
Figure 4:
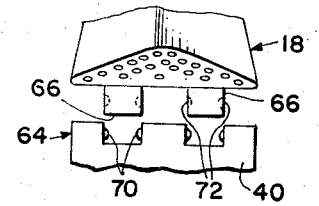
FIG. 4 is a front elevational view, drawn to an enlarged scale, illustrating the structure for detachably connecting the nose and lip portions of the apparatus shown in FIGS. 1 and 2 with respect to one another.
Figure 5:
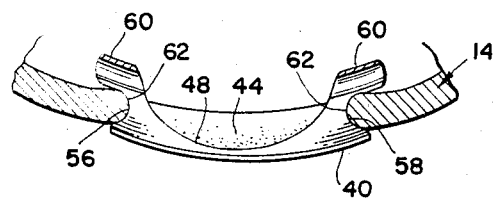
FIG. 5 is a top plan view of the lip protecting portion illustrated in FIG. 3.

The shield 38 may be fabricated of any suitable material, and for example may be fabricated of a suitable resilient plastic of a color consistent with normal lip hues, enabling the presentation of a neat and finished appearance when in use. In addition, a material of this type, being inherently resilient, will in effect enable the loops 60 to define springs, further enabling the members 40 and 42 to move towards and away from one another, as illustrated in phantom in FIG. 3, as the lips 44 and 46 themselves continue to perform their normal function. Since the loops 60 comprise the notches or grooves 62, the degree of resiliency is maintained at a minimum, thus reducing the force required to separate the members 40 and 42.

It will now be understood that the lip shield 38 is contoured, configured and arranged to be retained in a protective relationship with respect to the lip portion or mouth 14 substantially in the absence of accidental dislodgement or displacement therefrom. This is true whether the shield be utilized conjointly with the nose shield 18, or independently thereof. Moreover, the lip shield 38 is so constructed and arranged as to enable continued performance of the functions normally performed by the lip portion or mouth 14, namely, speaking, or placing of articles therebetween, such as cigarettes.

As hereinbefore pointed out, the nose shield 18 and the lip shield 38 are particularly adapted to be utilized conjointly or independently relative to one another. To this end, the protector apparatus 10 comprises, further, a hinge assembly generally designated by the reference character 64. The hinge assembly 64 comprises, in turn, a plurality of projections extending downwardly from the nose shield 18, and a plurality of projections 68 extending upwardly from the guard portion or member 40 of the lip shield 38. The projections 66 and 68 may be fabricated of any suitable material, and, when the nose shield 18 and the lip shield 38 are fabricated of a suitable resilient plastic, may be fabricated of the same material integrally therewith. The upwardly extending projections 68 comprise nodules or protuberances 70, and the projections 66 comprise recesses or grooves 72. It is now considered readily apparent that the projections 70 are particularly adapted to be removably disposed within the recesses 72, enabling the lip shield 38 to be detachably connected or operatively associated with the nose shield 18. In addition, the hinge assembly 64 enables the nose and lip shields to pivot with respect to one another, so that when they are utilized conjointly, the user may wear them in complete comfort.

It will now be understood that a nose and lip protector apparatus constructed in accordance with the principles of the present invention, such as the apparatus 10, comprises a nose shield 18 that is contoured, configured and arranged to enclose the nose portion 12 of the head 16 of a body, and to be worn in complete comfort, and a lip shield 38 that is contoured, configured and arranged to enclosure or encompass the lip portion or lips 14 thereof, and can be worn in complete comfort. Each portion is, in addition, contoured, configured and arranged to be retained in a protective position substantially in the absence of accidental displacement or dislodgement, while yet enabling the user to continue to perform certain normal functions. Furthermore, the apparatus 10, as constructed in accordance with the principles of the present invention, comprises a hinge assembly 64 enabling the nose and lip shields 18 and 38, respectively, to be detachably connected with one another, further enabling these portions to be used conjointly or independently.

Certain relative terminology, such as "inwardly", "downwardly", "upwardly", and the like, have been used in the foregoing description to facilitate an understanding of the present invention. This relative terminology is intended in its normal and accepted sense, and, therefore, is to be given the broadest possible interpretation and construction, particularly if and when used in the ensuing claims. It is, however, not in any way intended to be limiting.

While the invention has been shown, illustrated, described and disclosed in terms of an embodiment or modification which can be assumed in practice, the scope of the invention should not be deemed limited by the precise embodiment or modification herein shown, illustrated, described or disclosed, such other embodiments or modifications intended to be reserved especially as they fall within the scope of the claims here appended.

What is claimed is:

1. Protector apparatus for protecting the nose portion and lips of a body from the elements, substantially irrespective of prevailing weather conditions, and particularly to prevent them from becoming sunburned, windburned, or otherwise abused by exposure thereto, and comprising:
   a nose shield particularly adapted to substantially enclose the nose portion of a body;

said nose shield being contoured, configured and arranged so as to be retained in a protective position substantially in the absence of accidental dislodgement;

a lip shield detachably connected to said nose shield particularly adapted to substantially encompass the lips of a body;

said lip shield being contoured, configured and arranged so as to be retained in a protective position substantially in the absence of accidental dislodgement; and a hinge assembly detachably connecting said nose and lip shields with respect to one another, enabling said shields to conjointly be disposed in a protective position, further enabling said shields to be utilized independently of one another, and comprising:

a plurality of projections extending in opposite directions;

at least one of the projections extending in one of said directions having a protuberance, and at least one of the projections extending in another of said plurality of directions having a recess;

said protuberance being removably disposed within said recess detachably connecting said shields.

2. Protector apparatus for protecting the nose and lip portions of a body from the elements, substantially irrespective of prevailing weather conditions, and particularly from becoming sunburned, windburned, or otherwise abused by exposure thereto, and comprising:

a nose shield particularly adapted to substantially enclose the nose portion of a body, and having:

fastener elements for detachably connecting the shield to a pair of eyeglasses at the bridge thereof;

said nose shield being contoured, configured and arranged as to be retained in a protective position substantially in the absence of accidental dislodgement;

a lip shield detachably connected to said nose shield particularly adapted to substantially encompass the lips of a body, and comprising:

a plurality of lip shield members, one of which is particularly adapted to be disposed in a protective position relative to an upper lip, and another of which is particularly adapted to be disposed in a protective position with respect to a lower lip;

said lip shield members being contoured, configured and arranged as to be retained in a protective position substantially in the absence of accidental dislodgement; and a hinge assembly detachably connecting said nose and lip shields relative to one another, enabling said shields to be conjointly disposed in a protective position, further enabling said shields to be utilized independently of one another, and comprising a plurality of projections extending in one direction from said nose shield, and a plurality of projections extending in another direction from one of the lip shield members of said lip shield;

the projections extending in one of said directions having protuberances, and the projections extending in the other direction having recesses;

said protuberances being removably disposed within said recesses, detachably connecting said shields.

3. Protector apparatus for protecting the nose and lip portions of a body from the elements, substantially irrespective of prevailing weather conditions, and particularly from becoming sunburned, windburned, or otherwise abused by exposure thereto, and comprising:

a nose shield particularly adapted to substantially enclose the nose portion of a body, and comprising:

fastening elements for detachably positioning said nose shield with respect to a pair of eyeglasses at the bridge thereof; and a perforate bottom portion;

said nose shield being contoured, configured and arranged to be retained in a protective position substantially in the absence of accidental dislodgement;

a lip shield detachably connected to said nose shield particularly adapted to substantially encompass the lips of a body, and comprising:

upper and lower lip shield members contoured, configured and arranged to substantially encompass a corresponding one of the lips of a body;

said upper and lower lip shield members being contoured, configured and arranged as to be retained in a protective position with respect to a corresponding one of the lips of body substantially in the absence of accidental dislodgement, and having:

inwardly extending walls, said inwardly extending walls defining loops;

said loops being connected with one another to enable the ready and free separation of and relative movement between the upper and lower lip shield members; and a hinge assembly detachably connecting said nose and lip shields, enabling the shields to conjointly be disposed in a protective position, further enabling the shields to be utilized independently of one another, and comprising:

a plurality of projections extending in one direction from the bottom perforate portion of said nose shield, and having:

a plurality of recesses; and a plurality of projections extending in another direction from the upper lip shield member of said lip shield, and having:

a plurality of protuberances;

the projections extending from said nose shield being disposable between the projections extending from said lip shield, and the protuberances being removably disposed within said recesses detachably connecting said shields, further enabling the shields to pivot with respect to one another to enhance the comfort in which the shields can be worn.

4. Apparatus as defined in claim 3, wherein:

the nose and lip shields are fabricated of a suitable resilient plastic material;

the projections extending from each of said shields are integrally fabricated of the same material.

References Cited

UNITED STATES PATENTS

| | | | |
|---|---|---|---|
| 1,171,973 | 2/1916 | Patterson | 128—139 |
| 1,962,818 | 6/1934 | Hoffman. | |
| 2,178,800 | 11/1939 | Lombard. | |
| 2,434,078 | 1/1948 | Malerman | 2—9 |
| 2,589,504 | 3/1952 | Miller. | |
| 3,058,462 | 10/1962 | Greenblum. | |

JORDAN FRANKLIN, *Primary Examiner.*

J. R. BOLER, *Assistant Examiner.*